United States Patent
Setya et al.

(10) Patent No.: US 7,839,307 B2
(45) Date of Patent: Nov. 23, 2010

(54) VIDEO SERIALIZER AND DESERIALIZER WITH MAPPING CONVERSION

(75) Inventors: Tarun Setya, Pleasanton, CA (US); Cristian Samoila, Kanata (CA); Poupak Khodabandeh, Huntington Beach, CA (US)

(73) Assignee: Gennum Corporation (CA)

( * ) Notice: Subject to any disclaimer, the term of this patent is extended or adjusted under 35 U.S.C. 154(b) by 64 days.

(21) Appl. No.: 12/417,311

(22) Filed: Apr. 2, 2009

(65) Prior Publication Data

US 2009/0303381 A1    Dec. 10, 2009

Related U.S. Application Data

(60) Provisional application No. 61/042,548, filed on Apr. 4, 2008.

(51) Int. Cl.
  *H03M 7/00* (2006.01)
(52) U.S. Cl. .............................. 341/50; 341/55; 341/56
(58) Field of Classification Search .................. 341/50, 341/55–56
  See application file for complete search history.

(56) References Cited

U.S. PATENT DOCUMENTS

| | | | |
|---|---|---|---|
| 6,512,794 B1 * | 1/2003 | Fujiwara et al. | 375/240.26 |
| 7,030,931 B2 * | 4/2006 | Eckhardt et al. | 348/515 |
| 7,047,325 B2 | 5/2006 | Kondo | |
| 7,477,168 B2 * | 1/2009 | Yamashita | 341/55 |

FOREIGN PATENT DOCUMENTS

JP     2003-30330 A2    10/2003

OTHER PUBLICATIONS

Hudson et., "3G: The Evolution of the Serial Digital Interface (SDI)", SMPTE Motion Imaging Journal, Nov./Dec. 2006, www.smpte.org, pp. 472-481.
PCT/CA2009/000433, International Search Report dated Jul. 16, 2009, 3 pages.

* cited by examiner

*Primary Examiner*—Khai M Nguyen

(57) ABSTRACT

A method for converting data received in either a Level A or Level B SMPTE 425M compliant format into either a Level B or a Level A compliant format, respectively, includes receiving and processing data in one of a Level A or a Level B SMPTE 425M compliant format. Inputting the received Level A formatted data into a storage device and reading out Level B formatted data at an output of the storage device, or inputting Level B formatted data into the storage device and reading out Level A formatted data at an output of the storage device. Back-end circuitry further processes the Level A formatted data when Level B formatted data is received or further processes the Level B formatted data when Level A formatted data is received. The storage device is operated as a line multiplexer to convert data in a Level B format to data in a Level A format and is operated as a line demultiplexer to convert data in a Level A format to data in a Level B format. Receivers and transmitters capable of performing the method are also disclosed.

17 Claims, 25 Drawing Sheets

MATCH TO FIG. 1B

MATCH TO FIG. 1A

| Chroma | | Luma |
|---|---|---|
| 3FF | ▲ | 3FF |
| 000 | SAV | 000 |
| 000 | | 000 |
| XYZ | ▼ | XYZ |
| Cb0 | ▲ | Y0 |
| Cr0 | | Y1 |
| Cb1 | | Y2 |
| Cr1 | | Y3 |
| Cb2 | | Y4 |
| Cr2 | | Y5 |
| Cb3 | | Y6 |
| Cr3 | | Y7 |
| Cb4 | | Y8 |
| Cr4 | | Y9 |
| Cb5 | | Y10 |
| Cr5 | | Y11 |
| Cb6 | | Y12 |
| Cr6 | | Y13 |
| Cb7 | | Y14 |
| Cr7 | | Y15 |
| Cb8 | Active Video | Y16 |
| Cr8 | | Y17 |
| Cb9 | | Y18 |
| Cr9 | | Y19 |
| Cb10 | | Y20 |
| Cr10 | | Y21 |
| Cb11 | | Y22 |
| Cr11 | | Y23 |
| Cb12 | | Y24 |
| Cr12 | | Y25 |
| Cb13 | | Y26 |
| Cr13 | | Y27 |
| Cb14 | | Y28 |
| Cr14 | | Y29 |
| Cb15 | | Y30 |
| Cr15 | | Y31 |
| Cb16 | | Y32 |
| Cr16 | | Y33 |
| Cb17 | | Y34 |
| Cr17 | ▼ | Y35 |

FIG. 1B

MATCH TO FIG. 2B

FIG. 2B

MATCH TO FIG.2A

| | |
|---|---|
| 3FF | 3FF |
| 3FF | 3FF |
| 000 | 000 |
| 000 | 000 |
| 000 | 000 |
| 000 | 000 |
| XYZ | XYZ |
| XYZ | XYZ |
| Cb[3] 0 | Cb[2] 0 |
| Y[3] 0 | Y[2] 0 |
| Cr[3] 0 | Cr[2] 0 |
| Y[3] 1 | Y[2] 1 |
| Cb[3] 1 | Cb[2] 1 |
| Y[3] 2 | Y[2] 2 |
| Cr[3] 1 | Cr[2] 1 |
| Y[3] 3 | Y[2] 3 |
| Cb[3] 2 | Cb[2] 2 |
| Y[3] 4 | Y[2] 4 |
| Cr[3] 2 | Cr[2] 2 |
| Y[3] 5 | Y[2] 5 |
| Cb[3] 3 | Cb[2] 3 |
| Y[3] 6 | Y[2] 6 |
| Cr[3] 3 | Cr[2] 3 |
| Y[3] 7 | Y[2] 7 |
| Cb[3] 4 | Cb[2] 4 |
| Y[3] 8 | Y[2] 8 |
| Cr[3] 4 | Cr[2] 4 |
| Y[3] 9 | Y[2] 9 |
| Cb[3] 5 | Cb[2] 5 |
| Y[3] 10 | Y[2] 10 |
| Cr[3] 5 | Cr[2] 5 |
| Y[3] 11 | Y[2] 11 |
| Cb[3] 6 | Cb[2] 6 |
| Y[3] 12 | Y[2] 12 |
| Cr[3] 6 | Cr[2] 6 |
| Y[3] 13 | Y[2] 13 |
| Cb[3] 7 | Cb[2] 7 |
| Y[3] 14 | Y[2] 14 |
| Cr[3] 7 | Cr[2] 7 |
| Y[3] 15 | Y[2] 15 |
| Cb[3] 8 | Cb[2] 8 |
| Y[3] 16 | Y[2] 16 |
| Cr[3] 8 | Cr[2] 8 |
| Y[3] 17 | Y[2] 17 |

SAV

Active Video

MULTIPLEXED Y/C DATA

FIG. 5B

| 3FF |
| 3FF |
| 000 |
| 000 |
| 000 |
| 000 |
| XYZ |
| XYZ |
| Cb[2] 0 |
| Y[2] 0 |
| Cr[2] 0 |
| Y[2] 1 |
| Cb[2] 1 |
| Y[2] 2 |
| Cr[2] 1 |
| Y[2] 3 |
| Cb[2] 2 |
| Y[2] 4 |
| Cr[2] 2 |
| Y[2] 5 |
| Cb[2] 3 |
| Y[2] 6 |
| Cr[2] 3 |
| Y[2] 7 |
| Cb[2] 4 |
| Y[2] 8 |
| Cr[2] 4 |
| Y[2] 9 |
| Cb[2] 5 |
| Y[2] 10 |
| Cr[2] 5 |
| Y[2] 11 |
| Cb[2] 6 |
| Y[2] 12 |
| Cr[2] 6 |
| Y[2] 13 |
| Cb[2] 7 |
| Y[2] 14 |
| Cr[2] 7 |
| Y[2] 15 |
| Cb[2] 8 |
| Y[2] 16 |
| Cr[2] 8 |
| Y[2] 17 |

FIG. 5C

| | |
|---|---|
| 3FF | 3FF |
| 000 | 000 |
| 000 | 000 |
| XYZ | XYZ |
| Cb[2] 0 | Y[2] 0 |
| Cr[2] 0 | Y[2] 1 |
| Cb[2] 1 | Y[2] 2 |
| Cr[2] 1 | Y[2] 3 |
| Cb[2] 2 | Y[2] 4 |
| Cr[2] 2 | Y[2] 5 |
| Cb[2] 3 | Y[2] 6 |
| Cr[2] 3 | Y[2] 7 |
| Cb[2] 4 | Y[2] 8 |
| Cr[2] 4 | Y[2] 9 |
| Cb[2] 5 | Y[2] 10 |
| Cr[2] 5 | Y[2] 11 |
| Cb[2] 6 | Y[2] 12 |
| Cr[2] 6 | Y[2] 13 |
| Cb[2] 7 | Y[2] 14 |
| Cr[2] 7 | Y[2] 15 |
| Cb[2] 8 | Y[2] 16 |
| Cr[2] 8 | Y[2] 17 |

FIG. 5D

| | |
|---|---|
| 3FF | 3FF |
| 000 | 000 |
| 000 | 000 |
| XYZ | XYZ |
| LN0 | LN0 |
| LN1 | LN1 |
| CRC0 | CRC0 |
| CRC1 | CRC1 |
| Audio data[A] | Audio Ctl[A] |
| Audio data[A] | Audio Ctl[A] |
| Audio data[A] | Audio Ctl[A] |
| Audio data[A] | Audio Ctl[A] |
| Audio data[A] | YANC data[A] |
| Audio data[A] | YANC data[A] |
| Audio data[A] | YANC data[A] |
| Audio data[A] | YANC data[A] |
| 3FF | 3FF |
| 000 | 000 |
| 000 | 000 |
| XYZ | XYZ |
| Cb[2] 0 | Y[2] 0 |
| Cr[2] 0 | Y[2] 1 |
| Cb[2] 1 | Y[2] 2 |
| Cr[2] 1 | Y[2] 3 |
| Cb[2] 2 | Y[2] 4 |
| Cr[2] 2 | Y[2] 5 |
| Cb[2] 3 | Y[2] 6 |
| Cr[2] 3 | Y[2] 7 |
| Cb[2] 4 | Y[2] 8 |
| Cr[2] 4 | Y[2] 9 |
| Cb[2] 5 | Y[2] 10 |
| Cr[2] 5 | Y[2] 11 |
| Cb[2] 6 | Y[2] 12 |
| Cr[2] 6 | Y[2] 13 |
| Cb[2] 7 | Y[2] 14 |
| Cr[2] 7 | Y[2] 15 |
| Cb[2] 8 | Y[2] 16 |
| Cr[2] 8 | Y[2] 17 |

FIG. 6B

| |
|---|
| 3FF |
| 000 |
| 000 |
| XYZ |
| Y[2] 0 |
| Y[2] 1 |
| Y[2] 2 |
| Y[2] 3 |
| Y[2] 4 |
| Y[2] 5 |
| Y[2] 6 |
| Y[2] 7 |
| Y[2] 8 |
| Y[2] 9 |
| Y[2] 10 |
| Y[2] 11 |
| Y[2] 12 |
| Y[2] 13 |
| Y[2] 14 |
| Y[2] 15 |
| Y[2] 16 |
| Y[2] 17 |

FIG. 6C

| | |
|---|---|
| 3FF | 3FF |
| 000 | 000 |
| 000 | 000 |
| XYZ | XYZ |
| Cb[2] 0 | Y[2] 0 |
| Cr[2] 0 | Y[2] 1 |
| Cb[2] 1 | Y[2] 2 |
| Cr[2] 1 | Y[2] 3 |
| Cb[2] 2 | Y[2] 4 |
| Cr[2] 2 | Y[2] 5 |
| Cb[2] 3 | Y[2] 6 |
| Cr[2] 3 | Y[2] 7 |
| Cb[2] 4 | Y[2] 8 |
| Cr[2] 4 | Y[2] 9 |
| Cb[2] 5 | Y[2] 10 |
| Cr[2] 5 | Y[2] 11 |
| Cb[2] 6 | Y[2] 12 |
| Cr[2] 6 | Y[2] 13 |
| Cb[2] 7 | Y[2] 14 |
| Cr[2] 7 | Y[2] 15 |
| Cb[2] 8 | Y[2] 16 |
| Cr[2] 8 | Y[2] 17 |

| | |
|---|---|
| 3FF | 3FF |
| 3FF | 3FF |
| 000 | 000 |
| 000 | 000 |
| 000 | 000 |
| 000 | 000 |
| XYZ | XYZ |
| XYZ | XYZ |
| Cb[3] 0 | Cb[2] 0 |
| Y[3] 0 | Y[2] 0 |
| Cr[3] 0 | Cr[2] 0 |
| Y[3] 1 | Y[2] 1 |
| Cb[3] 1 | Cb[2] 1 |
| Y[3] 2 | Y[2] 2 |
| Cr[3] 1 | Cr[2] 1 |
| Y[3] 3 | Y[2] 3 |
| Cb[3] 2 | Cb[2] 2 |
| Y[3] 4 | Y[2] 4 |
| Cr[3] 2 | Cr[2] 2 |
| Y[3] 5 | Y[2] 5 |
| Cb[3] 3 | Cb[2] 3 |
| Y[3] 6 | Y[2] 6 |
| Cr[3] 3 | Cr[2] 3 |
| Y[3] 7 | Y[2] 7 |
| Cb[3] 4 | Cb[2] 4 |
| Y[3] 8 | Y[2] 8 |
| Cr[3] 4 | Cr[2] 4 |
| Y[3] 9 | Y[2] 9 |
| Cb[3] 5 | Cb[2] 5 |
| Y[3] 10 | Y[2] 10 |
| Cr[3] 5 | Cr[2] 5 |
| Y[3] 11 | Y[2] 11 |
| Cb[3] 6 | Cb[2] 6 |
| Y[3] 12 | Y[2] 12 |
| Cr[3] 6 | Cr[2] 6 |
| Y[3] 13 | Y[2] 13 |
| Cb[3] 7 | Cb[2] 7 |
| Y[3] 14 | Y[2] 14 |
| Cr[3] 7 | Cr[2] 7 |
| Y[3] 15 | Y[2] 15 |
| Cb[3] 8 | Cb[2] 8 |
| Y[3] 16 | Y[2] 16 |
| Cr[3] 8 | Cr[2] 8 |
| Y[3] 17 | Y[2] 17 |

FIG. 6D

FIG. 7A1
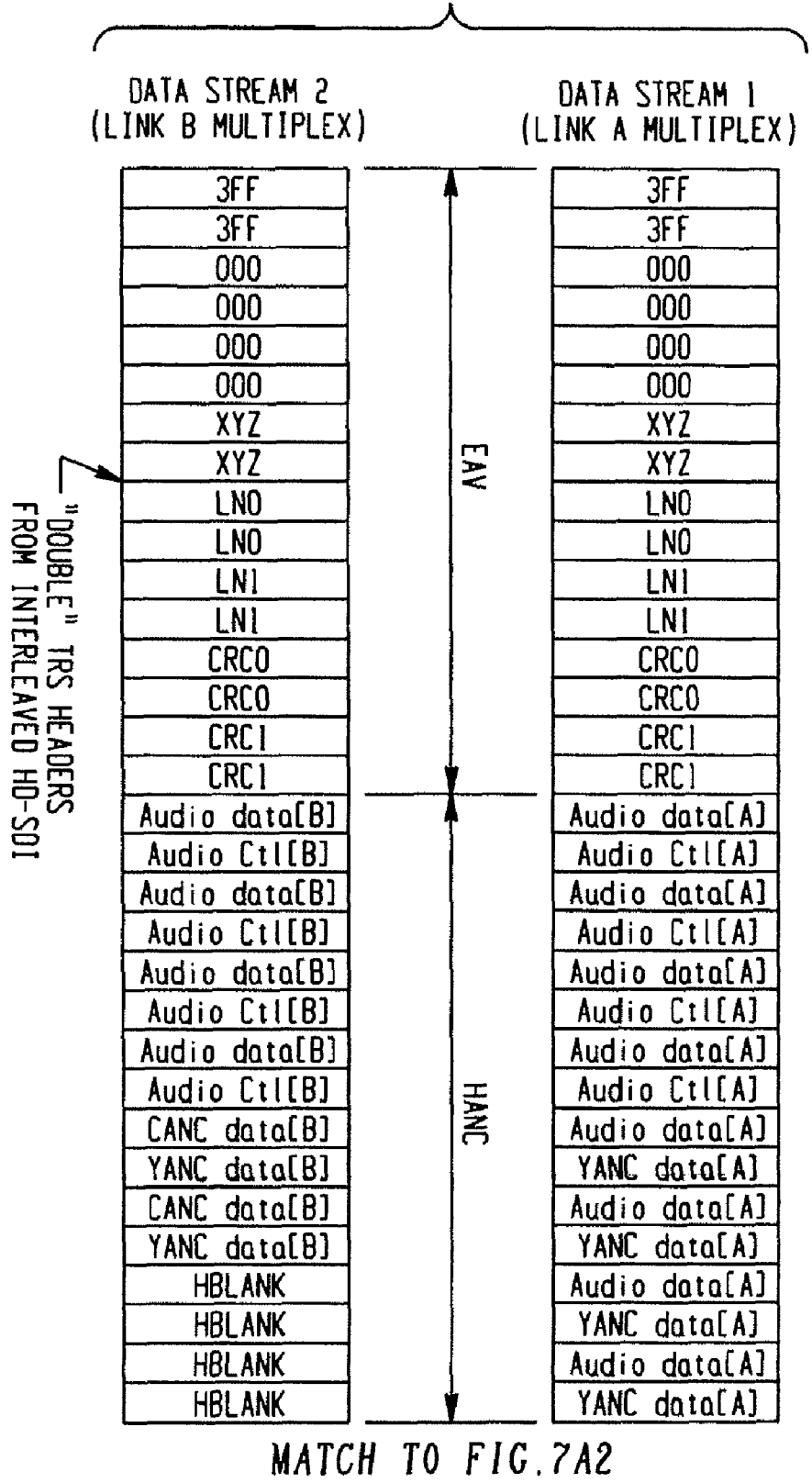
MATCH TO FIG. 7A2

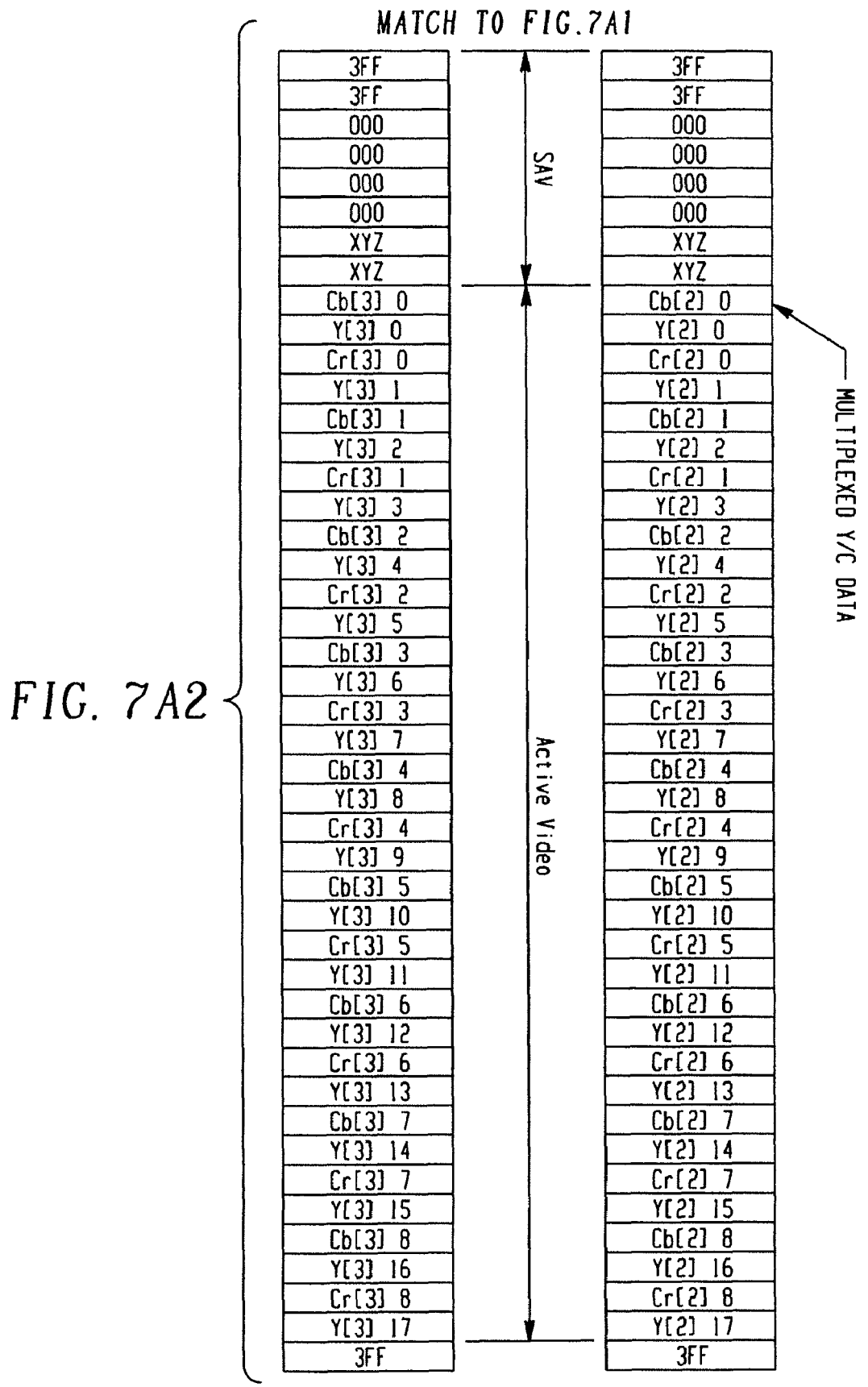
FIG. 7A2

FIG. 7B1

| HD LINK B C-CHANNEL | HD LINK B Y-CHANNEL | HD LINK A C-CHANNEL | HD LINK A Y-CHANNEL |
|---|---|---|---|
| 3FF | 3FF | 3FF | 3FF |
| 000 | 000 | 000 | 000 |
| 000 | 000 | 000 | 000 |
| XYZ | XYZ | XYZ | XYZ |
| LN0 | LN0 | LN0 | LN0 |
| LN1 | LN1 | LN1 | LN1 |
| CRC0 | CRC0 | CRC0 | CRC0 |
| CRC1 | CRC1 | CRC1 | CRC1 |
| Audio data[B] | Audio Ctl[B] | Audio data[A] | Audio Ctl[A] |
| Audio data[B] | Audio Ctl[B] | Audio data[A] | Audio Ctl[A] |
| Audio data[B] | Audio Ctl[B] | Audio data[A] | Audio Ctl[A] |
| Audio data[B] | Audio Ctl[B] | Audio data[A] | Audio Ctl[A] |
| CANC data[B] | YANC data[B] | Audio data[A] | YANC data[A] |
| CANC data[B] | YANC data[B] | Audio data[A] | YANC data[A] |
| HBLANK | HBLANK | Audio data[A] | YANC data[A] |
| HBLANK | HBLANK | Audio data[A] | YANC data[A] |
| 3FF | 3FF | 3FF | 3FF |
| 000 | 000 | 000 | 000 |
| 000 | 000 | 000 | 000 |
| XYZ | XYZ | XYZ | XYZ |

← (LINE NO. = 1)

MATCH TO FIG. 7B2

MATCH TO FIG.7B1

| Cb[3] 0 | Y[3] 0 | | Cb[2] 0 | Y[2] 0 | |
|---|---|---|---|---|---|
| Cr[3] 0 | Y[3] 1 | | Cr[2] 0 | Y[2] 1 | |
| Cb[3] 1 | Y[3] 2 | | Cb[2] 1 | Y[2] 2 | |
| Cr[3] 1 | Y[3] 3 | ODD LINES ON LINK B (1,3,5...) | Cr[2] 1 | Y[2] 3 | EVEN LINES ON LINK A (2, 4, 6..) |
| Cb[3] 2 | Y[3] 4 | | Cb[2] 2 | Y[2] 4 | |
| Cr[3] 2 | Y[3] 5 | | Cr[2] 2 | Y[2] 5 | |
| Cb[3] 3 | Y[3] 6 | | Cb[2] 3 | Y[2] 6 | |
| Cr[3] 3 | Y[3] 7 | | Cr[2] 3 | Y[2] 7 | |
| Cb[3] 4 | Y[3] 8 | | Cb[2] 4 | Y[2] 8 | |
| Cr[3] 4 | Y[3] 9 | | Cr[2] 4 | Y[2] 9 | |
| Cb[3] 5 | Y[3] 10 | | Cb[2] 5 | Y[2] 10 | |
| Cr[3] 5 | Y[3] 11 | | Cr[2] 5 | Y[2] 11 | |
| Cb[3] 6 | Y[3] 12 | | Cb[2] 6 | Y[2] 12 | |
| Cr[3] 6 | Y[3] 13 | | Cr[2] 6 | Y[2] 13 | |
| Cb[3] 7 | Y[3] 14 | | Cb[2] 7 | Y[2] 14 | |
| Cr[3] 7 | Y[3] 15 | | Cr[2] 7 | Y[2] 15 | |
| Cb[3] 8 | Y[3] 16 | | Cb[2] 8 | Y[2] 16 | |
| Cr[3] 8 | Y[3] 17 | | Cr[2] 8 | Y[2] 17 | |

FIG. 7B2

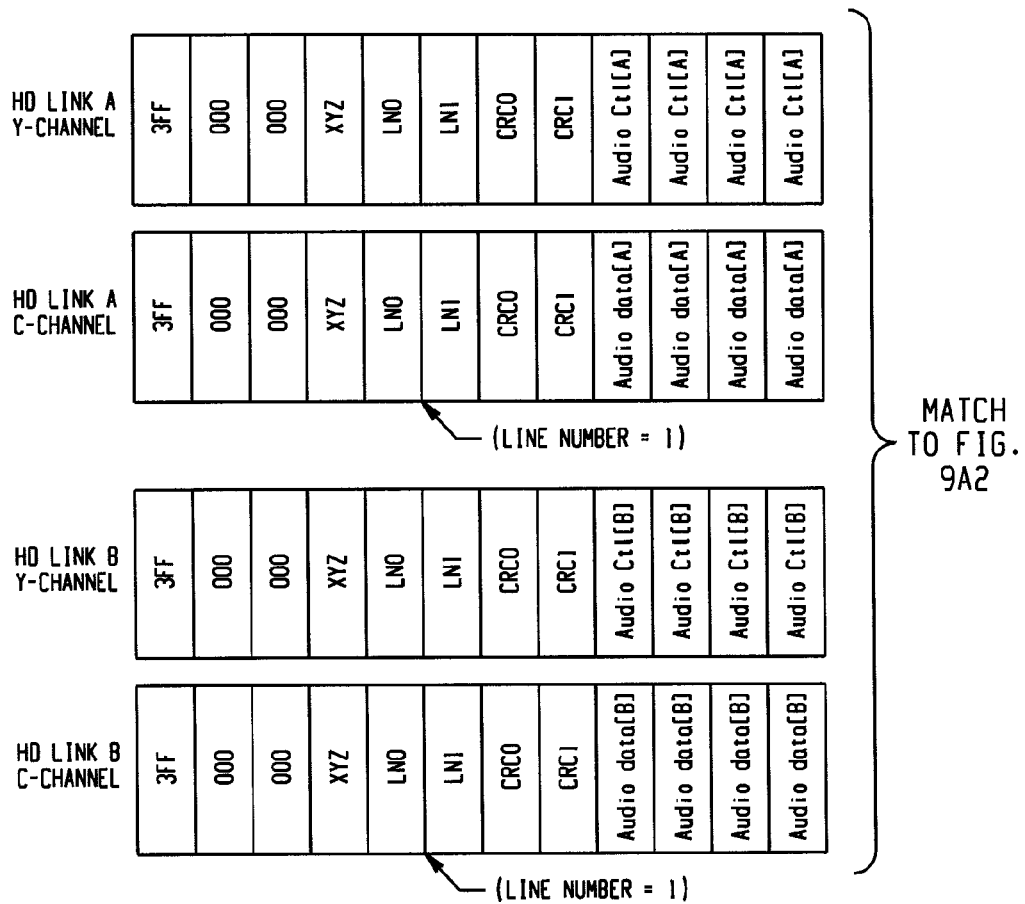
FIG. 9A1
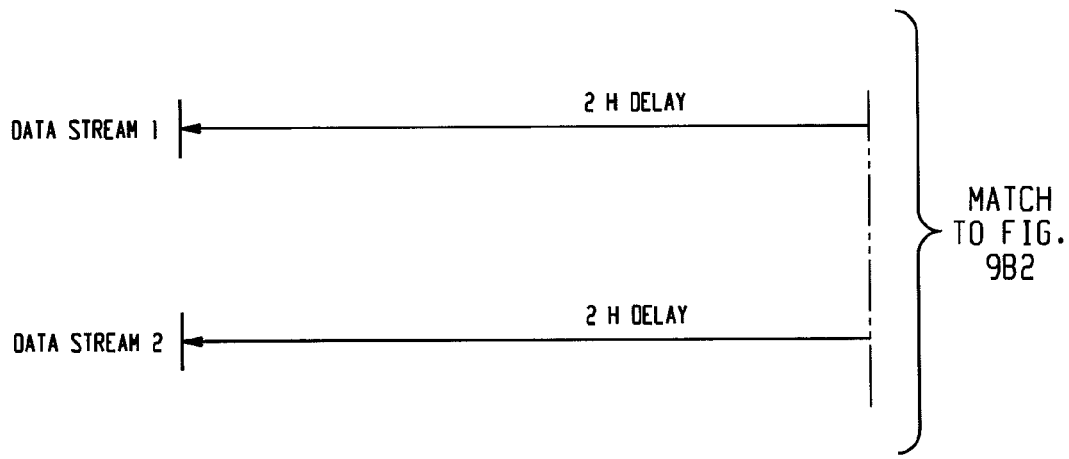
FIG. 9B1

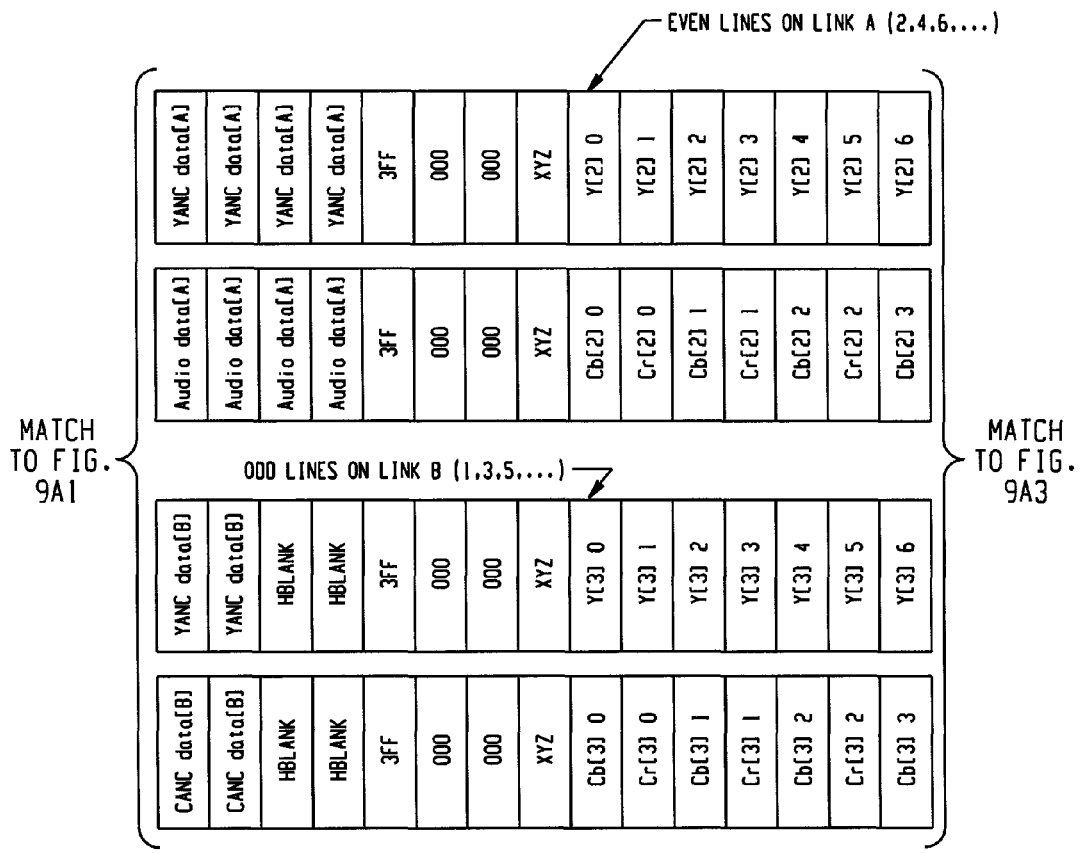
FIG. 9A2
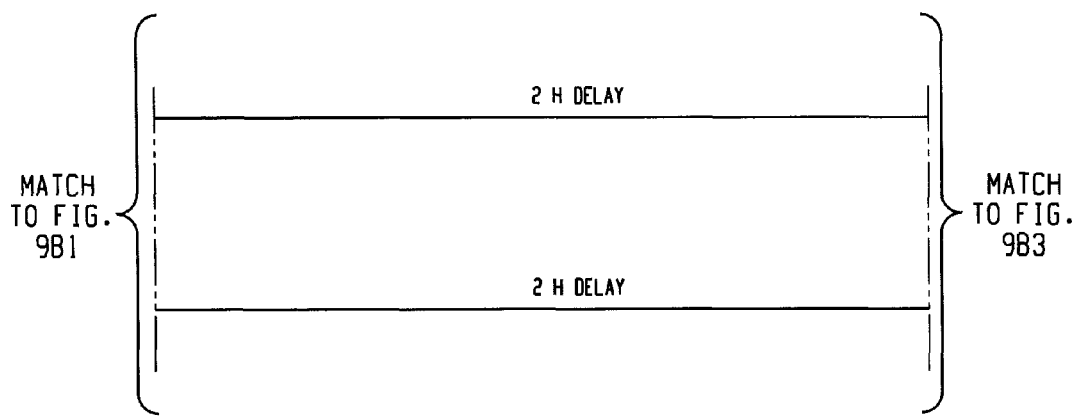
FIG. 9B2

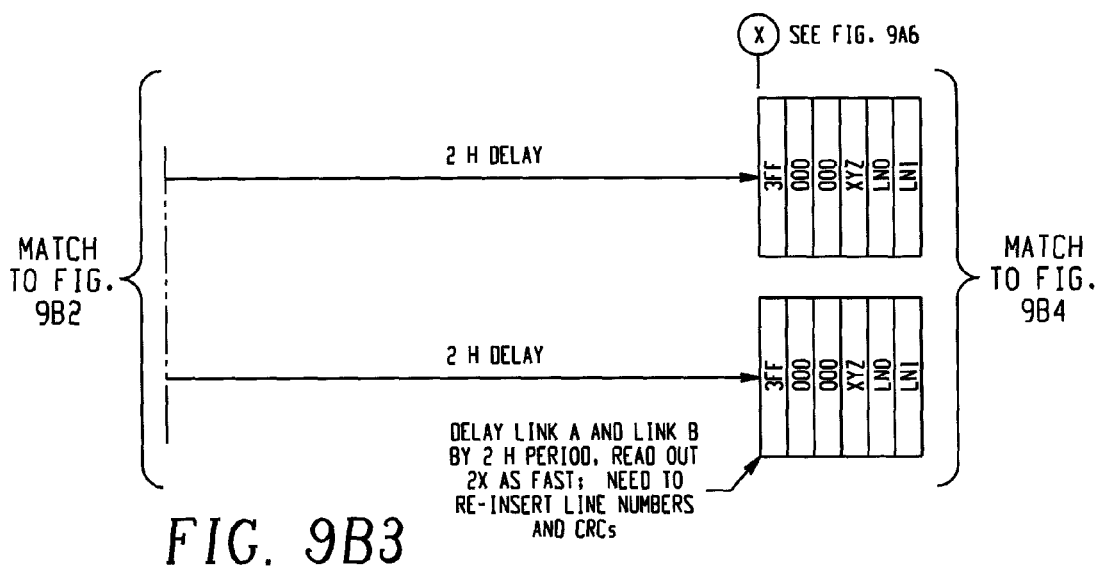
FIG. 9A3
FIG. 9B3

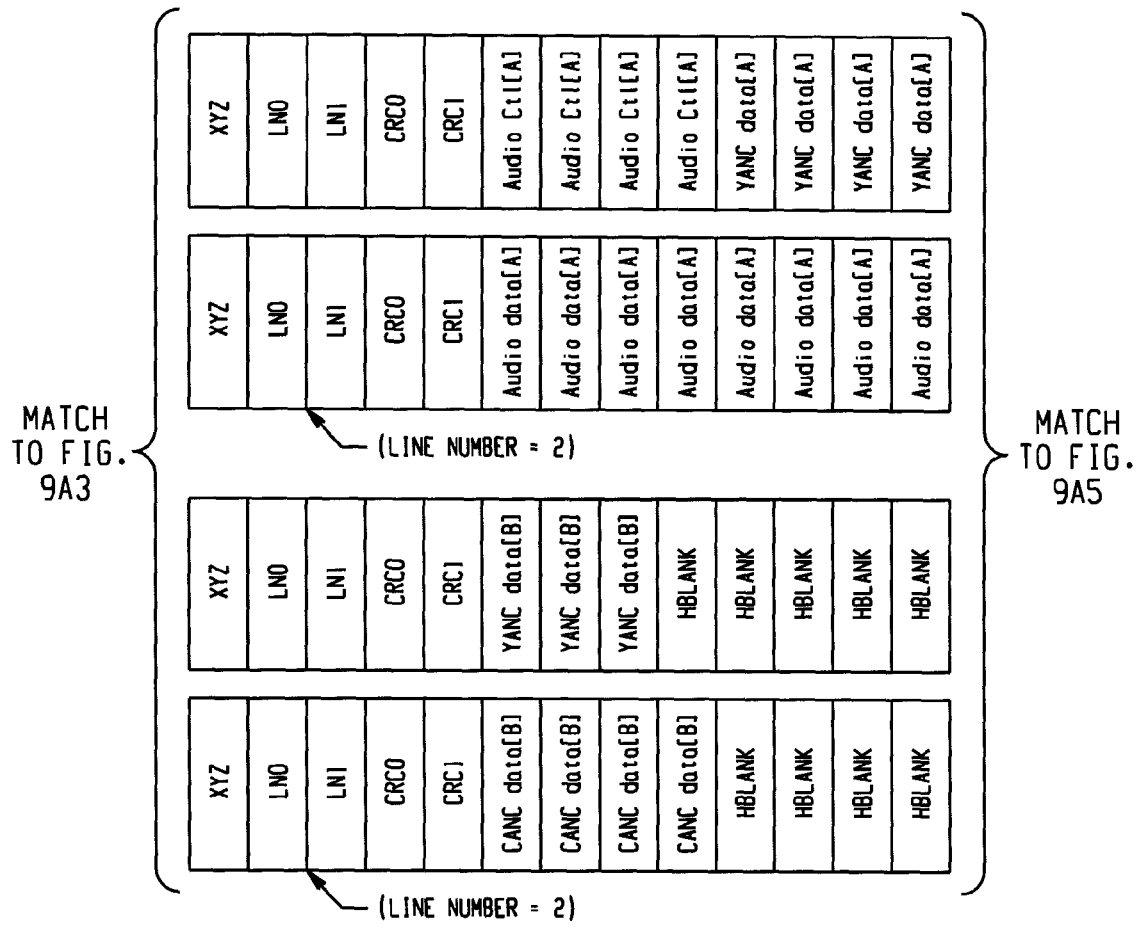
FIG. 9A4
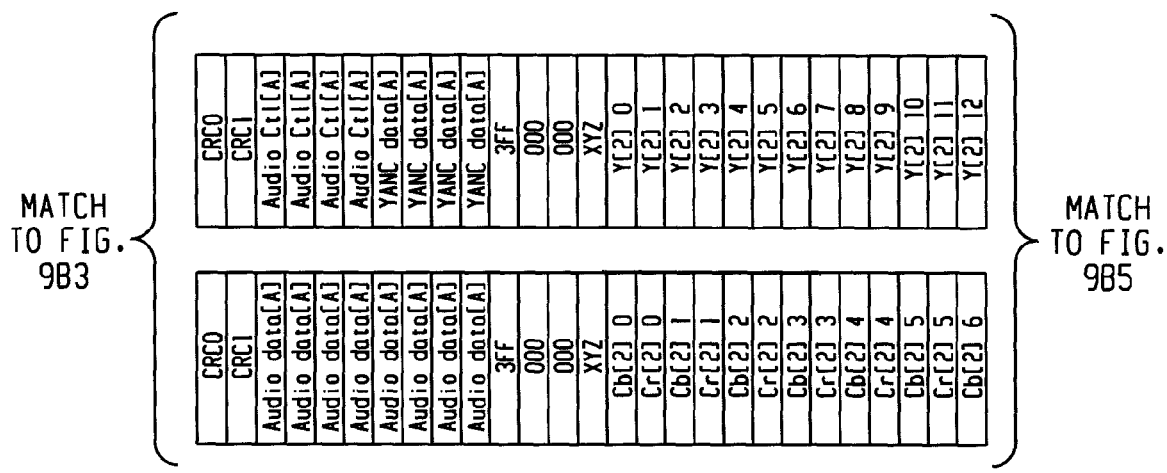
FIG. 9B4

MATCH TO FIG. 9A5

| Cb[4] 5 | Cr[4] 5 | Cb[4] 6 | Cr[4] 6 | Cb[4] 7 | Cr[4] 7 | Cb[4] 8 | Cr[4] 8 |

| Y[4] 10 | Y[4] 11 | Y[4] 12 | Y[4] 13 | Y[4] 14 | Y[4] 15 | Y[4] 16 | Y[4] 17 |

| Cb[5] 5 | Cr[5] 5 | Cb[5] 6 | Cr[5] 6 | Cb[5] 7 | Cr[5] 7 | Cb[5] 8 | Cr[5] 8 |

| Y[5] 10 | Y[5] 11 | Y[5] 12 | Y[5] 13 | Y[5] 14 | Y[5] 15 | Y[5] 16 | Y[5] 17 |

FIG. 9A6  (X)

MATCH TO FIG. 9B5

VIDEO SERIALIZER AND DESERIALIZER WITH MAPPING CONVERSION

The present application claims the benefit of copending U.S. Ser. No. 61/042,548 entitled Video Serializer and Deserializer with Mapping Conversion, filed 4 Apr. 2008, the entirety of which is hereby incorporated by reference for all purposes.

TECHNICAL FIELD

The technology described in this document relates generally to the field of digital audio/video signal processing. More particularly, this document describes a transmitter/receiver with the ability to perform mapping conversion.

BACKGROUND

The serial digital interface (SDI) at 3 Gb/sec was introduced to allow production and transmission of high-definition content at higher frame rates (e.g., 1080 p at 50 fps and 60 fps), higher bit depths (e.g., 12 bits per component), and to provide support for R'G'B' and 4:4:4:4 processing. The bandwidth requirements to transmit these video formats in serial digital form exceed the capabilities of a single SMPTE 292M interface. One solution to that problem is the use of two SMPTE 292M 1.5-Gb/sec links (i.e., dual-link), as specified in SMPTE 372M. However, dual-link interfaces are expensive to implement, as two sets of semiconductor devices are required to support each 1.5-Gb/sec link. Additional complexity is introduced by formatting 1080 p data per SMPTE 372M, as the data must be line demultiplexed for transmission, and re-multiplexed prior to image processing and display.

The data mapping standard for 3 Gb/sec SDI is defined in SMPTE 425M. Within this standard, Level A represents the direct image format (component) mapping, where the video signal components (R, G, B or Y, Cb, Cr) are directly mapped onto two 10-bit parallel data streams. Level B in the standard represents 2×SMPTE 292M HD SDI mapping, which allows for transmission of two parallel 10-bit interfaces of the same line and frame structure, constructed in conformance with SMPTE 292M. Level B also includes support for dual-link video.

Level A mapping has the advantage of allowing the transmitter and receiver to handle video data in component form and interface directly with other Level A compliant equipment, such as image processors. Level B mapping has the advantage of allowing easy conversion between the 3 Gb/sec SDI link and dual-link equipment. However, a fundamental incompatibility between the two mapping options exists, because Level A formatted data retains each video component separately whereas Level B formatted data does not. If the customer's video system requires conversion between the two mapping formats, this is a non-trivial exercise that requires considerable hardware resources.

If a serializer does not have the capability to perform the Level A format to Level B format mapping conversion internally, a secondary device (such as an FPGA) is required in the customer's system to allow interfacing with a Level B serial link. Eliminating the requirement for this FPGA reduces customers' system costs, and simplifies the overall system. Similarly, if the receiver does not have the capability to perform the Level B format to the Level A format mapping conversion internally, a secondary device (such as an FPGA) will be required in the customer's system to allow interfacing with an image processor. Eliminating the requirement for this FPGA also reduces customers' system costs, and simplifies the overall system.

Although solutions exist in the marketplace that allow for single-link to dual-link conversion of 3 Gb/sec SDI video and vice-versa, the existing solutions do not support the capability to convert between Level B and Level A mappings.

SUMMARY

The present disclosure is directed, in one embodiment, to a method performed in a single device for converting data received in either a Level A or Level B SMPTE 425M compliant format into either a Level B or a Level A compliant format, respectively. The method is comprised of receiving and processing data in one of a Level A or a Level B SMPTE 425M compliant format. Inputting the received Level A formatted data into a storage device and reading out Level B formatted data at an output of the storage device, or inputting Level B formatted data into the storage device and reading out Level A formatted data at an output of the storage device. Back-end circuitry further processes the Level A formatted data when Level B formatted data is received or further processes the Level B formatted data when Level A formatted data is received. The storage device is operated as a line multiplexer to convert data in a Level B format to data in a Level A format and is operated as a line demultiplexer to convert data in a Level A format to data in a Level B format.

The present disclosure is also directed to a receiver/transmitter for converting data received in either a Level A or Level B SMPTE 425M compliant format into either a Level B or a Level A compliant format, respectively. The receiver/transmitter is comprised of front-end circuitry for receiving and processing data in one of a Level A or a Level B SMPTE 425M compliant format. A storage device receives as input the processed Level A formatted data and reads out Level B formatted data or receives as input Level B formatted data and reads out Level A formatted data. Back-end circuitry is provided for further processing and outputting/transmitting Level A formatted data when Level B formatted data is received or Level B formatted data when Level A formatted data is received.

One benefit of the improvement described herein is that, in the case of Level A to Level B conversion in the transmitter, the transmitter (serializer) can receive video data from an image processor (at 1080 p resolution) in component format (Level A mapping), and send it in a Level B format. Another benefit of the improvement described herein is that, in the case of Level B to Level A conversion, the receiver can receive serial data in Level B format, and convert it to parallel component format (Level A mapping) to interface seamlessly with an image processor. Those advantages and benefits, and others, will be apparent from the following description.

BRIEF DESCRIPTION OF THE FIGURES

For the present disclosure to be easily understood and readily practiced, the present disclosure will now be described, for purposes of illustration and not limitation, in connection with the following figures.

FIGS. 1A and 1B are an example of data formatted according to Level A of SMPTE 325M.

FIGS. 2A and 2B are an example of data formatted according to Level B of SMPTE 325M. In FIG. 2, the data streams are 372M line interleaved.

FIGS. 5B-5D illustrate data streams at various points in the block diagram of FIG. 5A.

FIGS. 6B-6D illustrate data streams at various points in the block diagram of FIG. 6A.

FIG. 7A illustrates Level B formatted data line interleaved according to 372M while FIG. 7B illustrates the data of FIG. 7A demultiplexed.

FIGS. 9A and 9B illustrate an example of line interleaving of Link A and Link B according to the concept of FIG. 8.

FIGS. 11A and 11B illustrate an unscrambled output of the transmitter of FIG. 10.

DETAILED DESCRIPTION

The invention described herein is a transmitter/receiver with the ability to re-map 3 Gb/sec SDI data formatted as per SMPTE 425M as follows: (1) conversion from the Level A mapping format to the Level B mapping format; and (2) conversion from the Level B mapping format to the Level A mapping format.

Figure 1A:
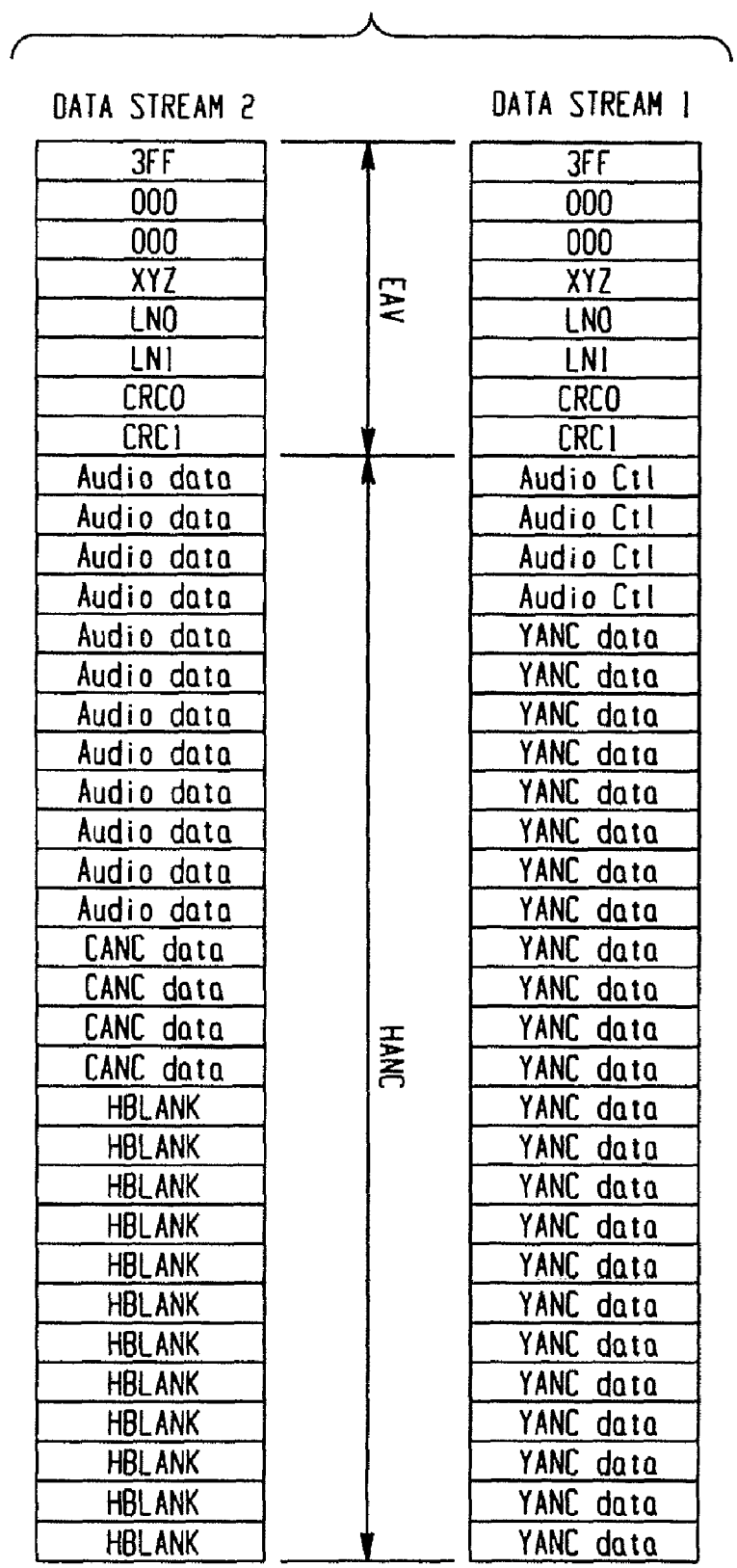

Level A represents the direct image format mapping, where the video signal components (R, G, B or Y, Cb, Cr) are directly mapped onto two 10-bit parallel data streams (Data Stream 1 and Data Stream 2), as shown in FIGS. 1A and 1B.

Figure 2A:
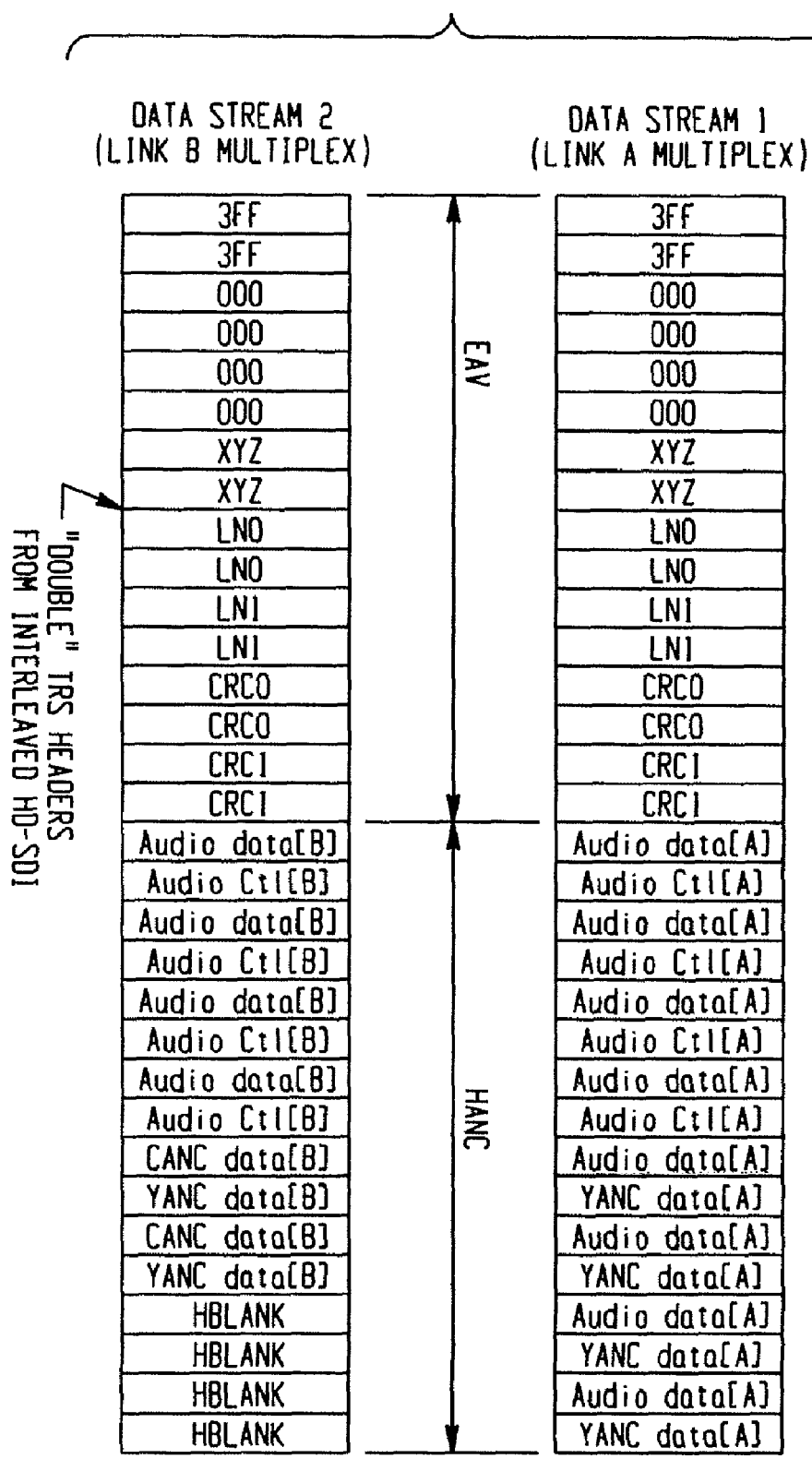

Level B represents 2×SMPTE 292M HD SDI mapping, and allows for transmission of two parallel 10-bit interfaces of the same line and frame structure, constructed in conformance with SMPTE 292M. In the special case of SMPTE 372M dual link mapping (shown in FIGS. 2A and 2B), Data Stream 1 contains the 10-bit data words of the Link A interface and Data Stream 2 contains all of the data words of the Link B interface. In the case of 1080 p 4:2:2 10-bit video data running at 50 or 60 frames per second, data in the YCbCr format (4:2:2P) are transparently divided line sequentially into two data streams, each equivalent to a 4:2:2 component signal that can be transported by SMPTE 292M as shown in FIG. 2:

One benefit of the improvement described herein is that, in the case of Level A to Level B conversion in the transmitter, the transmitter (serializer) can receive video data from an image processor (at 1080 p resolution) in component format (Level A mapping), and send it serially in Level B format, so that it can interface seamlessly with dual-link equipment. An example of a camera-capture application 10 is shown in FIG. 3.

Figure 3:
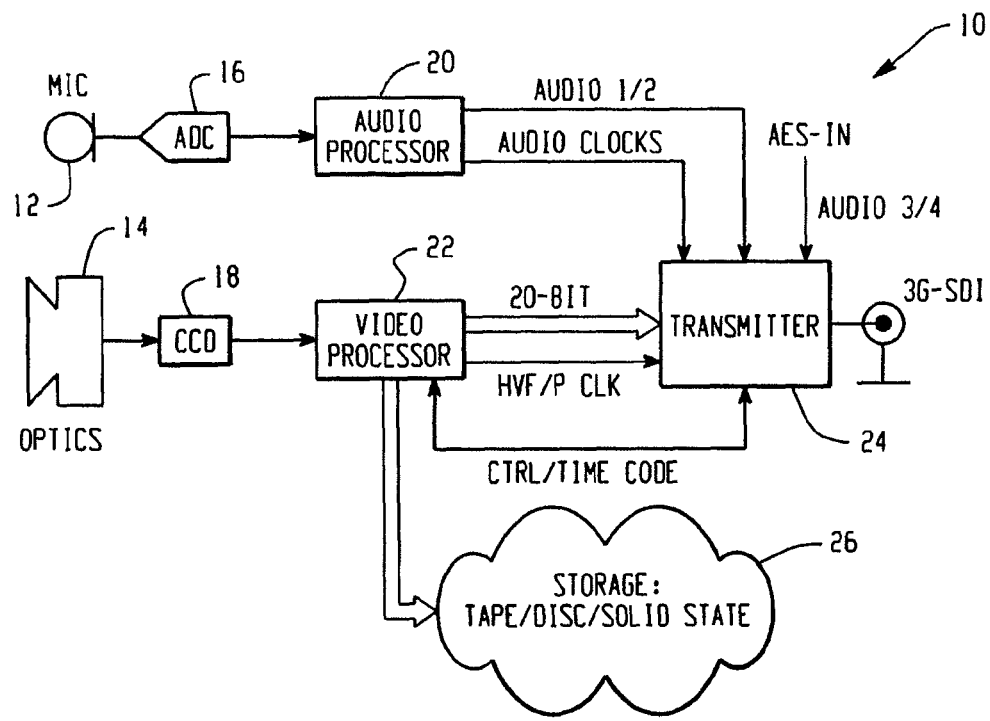
FIG. 3 is a block diagram of an example of a camera-capture application in which the concepts of the present disclosure may be applied.

In FIG. 3, a microphone 12 and optics 14 of a camera interface through an analog-to-digital converter 16 and a charge coupled device 18 with an audio processor 20 and a video processor 22, respectively. Each of the audio processor 20 and video processor 22 provides data in component format (Level A mapping) to a transmitter 24. As described below, the transmitter 24 converts the Level A formatted data to Level B formatted data for transmission over a communication link. A transmitter (described below) is also disclosed which is capable of converting Level B formatted data to Level A formatted data. Completing the description of FIG. 3, the video processor 22 is in communication with a storage device 26 which may take any form known to those of ordinary skill in the art.

Another significant benefit of the improvement described herein is that, in the case of Level B to Level A conversion, the receiver can receive serial data in Level B format, and convert it to parallel component format (Level A mapping) to interface seamlessly with an image processor. In the case of the transmitter performing Level B to Level A conversion, the transmitter can receive parallel data in Level B format and convert it to serial data in Level A format to interface with single link 3G equipment. An example of a monitor display application 30 is shown in FIG. 4.

Figure 4:
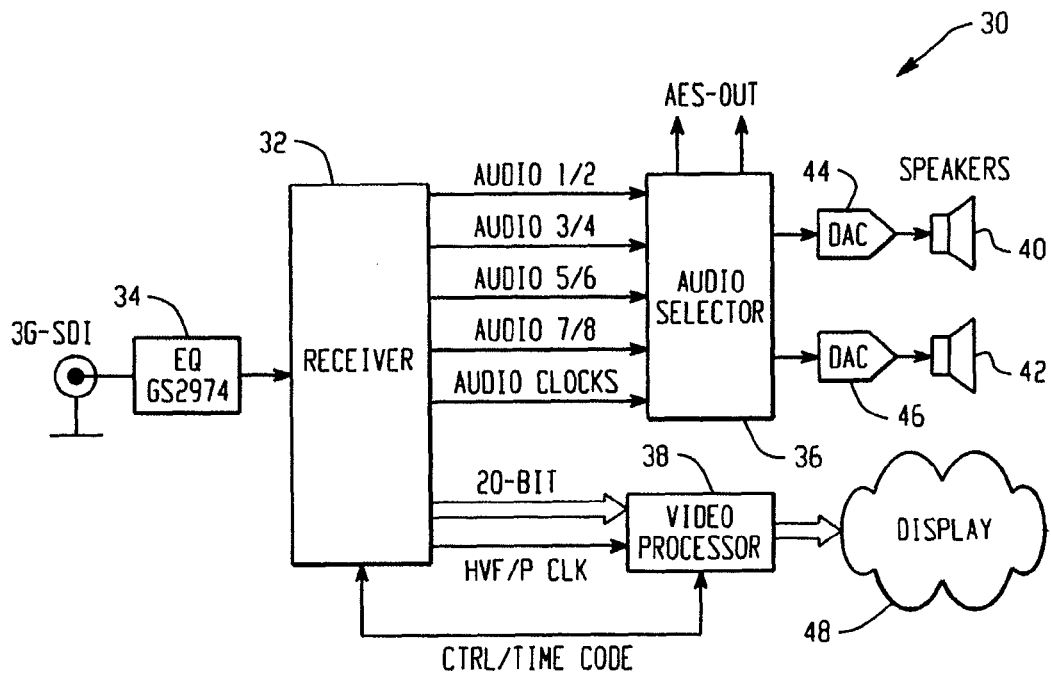
FIG. 4 is a block diagram of an example of a display application in which the concepts of the present disclosure may be employed.

In FIG. 4, the data signal is input to a receiver 32 through an equalizer 34. The receiver, as described below in conjunction with FIGS. 5A and 5B, processes the received data and outputs the processed data to an audio selector 36 and a video processor 38. The audio selector 36 provides signals to speakers 40 and 42 through digital to analog converters 44 and 46, respectively. The video processor 38 provides signals to a display 48.

Mapping conversion in either device from Level A to Level B, or vice versa: (1) negates the need for external expensive circuitry (i.e., an FPGA) in the system, OR (2) frees up existing resources in an FPGA that already exist in the system, which allows the customer the option of performing other high-priority functions in the FPGA while reducing routing density, improving timing closure, and reducing overall system development time. Additionally, the Level B to Level A conversion implemented in the receiver will handle upstream synchronous video switches (from one Level B 3 Gb/sec link to another Level B 3 Gb/sec link, compliant to SMPTE RP168) in a 'seamless' manner, such that the video system will not observe discontinuities in the output timing reference signals, nor corruption of video content.

Figure 5A:
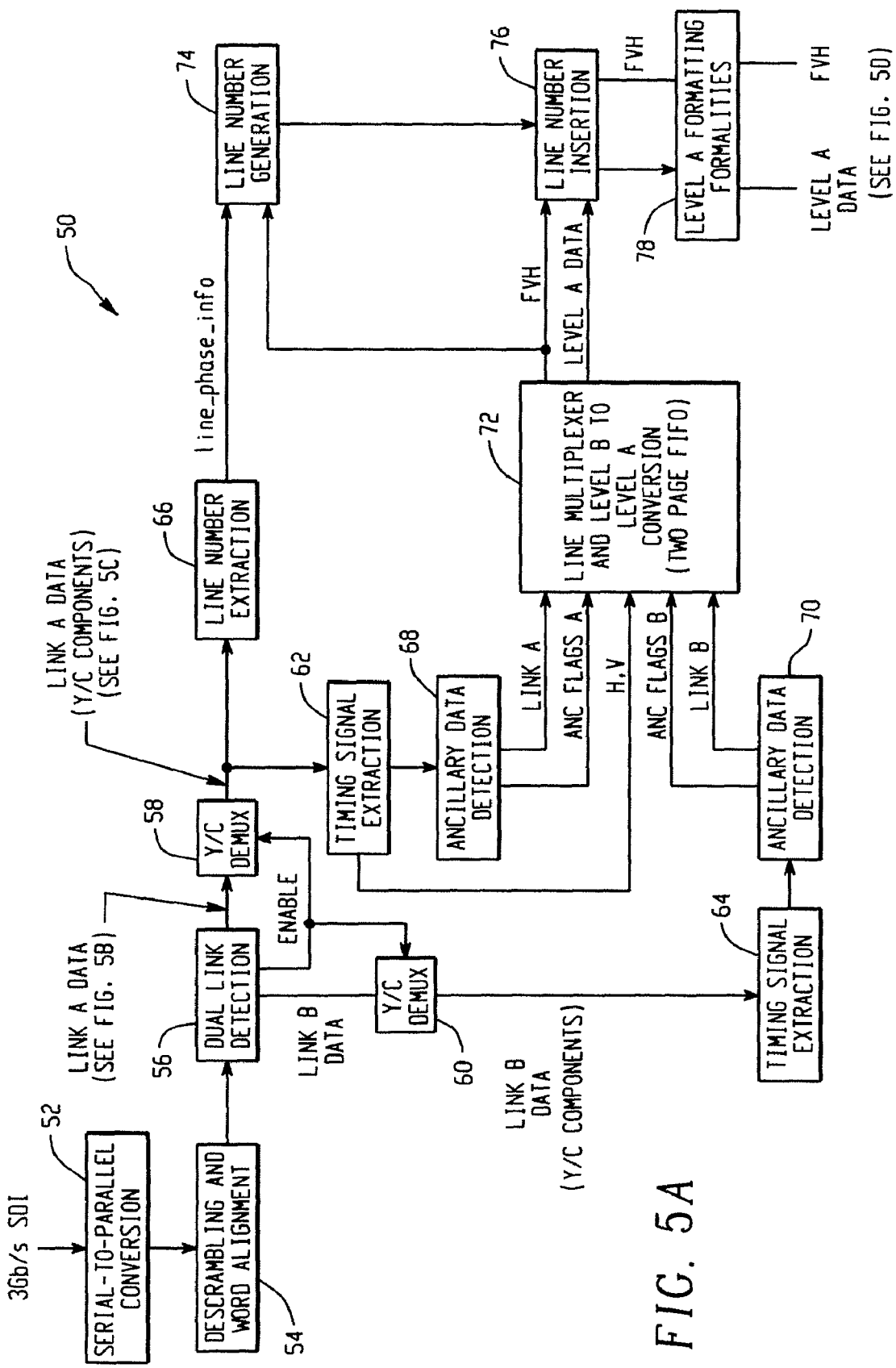
FIG. 5A is a block diagram illustrating a receiver incorporating Level B to Level A conversion of data according to the concepts of the present disclosure.

In FIG. 5A, an example of Level B to Level A conversion in a receiver 50 is shown. The assumption is that Link A and Link B are phase-aligned at the transmitter and are part of the same video stream. The received signal is input to a serial to parallel converter for serial to parallel conversation as illustrated at 52. The parallel data is descrambled and word aligned at 54. The data is then input to a dual link detector at 56 which separates the data into Link A data and Link B data. The Link A data (shown in FIG. 5B) is input to a Y/C demultiplexer 58 and the output of demultiplexer 58 is shown in FIG. 5C. The Link B data is input to a Y/C demultiplexer 60. Each of the demultiplexers 58 and 60 is responsive to an enable signal provided by the dual link detector 56. Timing reference information is extracted from Link A at 62 while timing reference information is extracted from Link B at 64. Line number extraction is performed on the Link A data at 66. Note that at this point each link contains identical line numbers as the links are embedded according to the SMPTE 292M digital interface as specified in SMPTE 372M. Ancillary data flag detection is performed on Link A at 68 and on Link B at 70 for further downstream formatting functions, if necessary.

Figure 8:
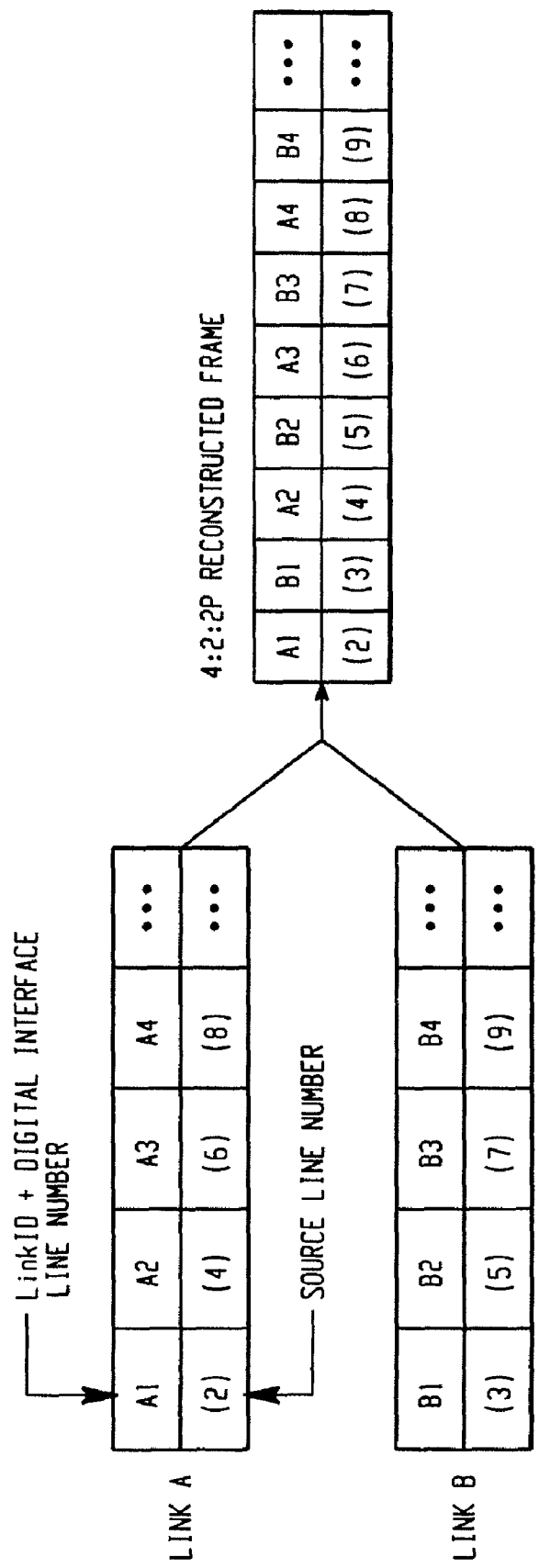
FIG. 8 illustrates a line interleaving concept according to the present disclosure.
Figures 9A5, 9B5:
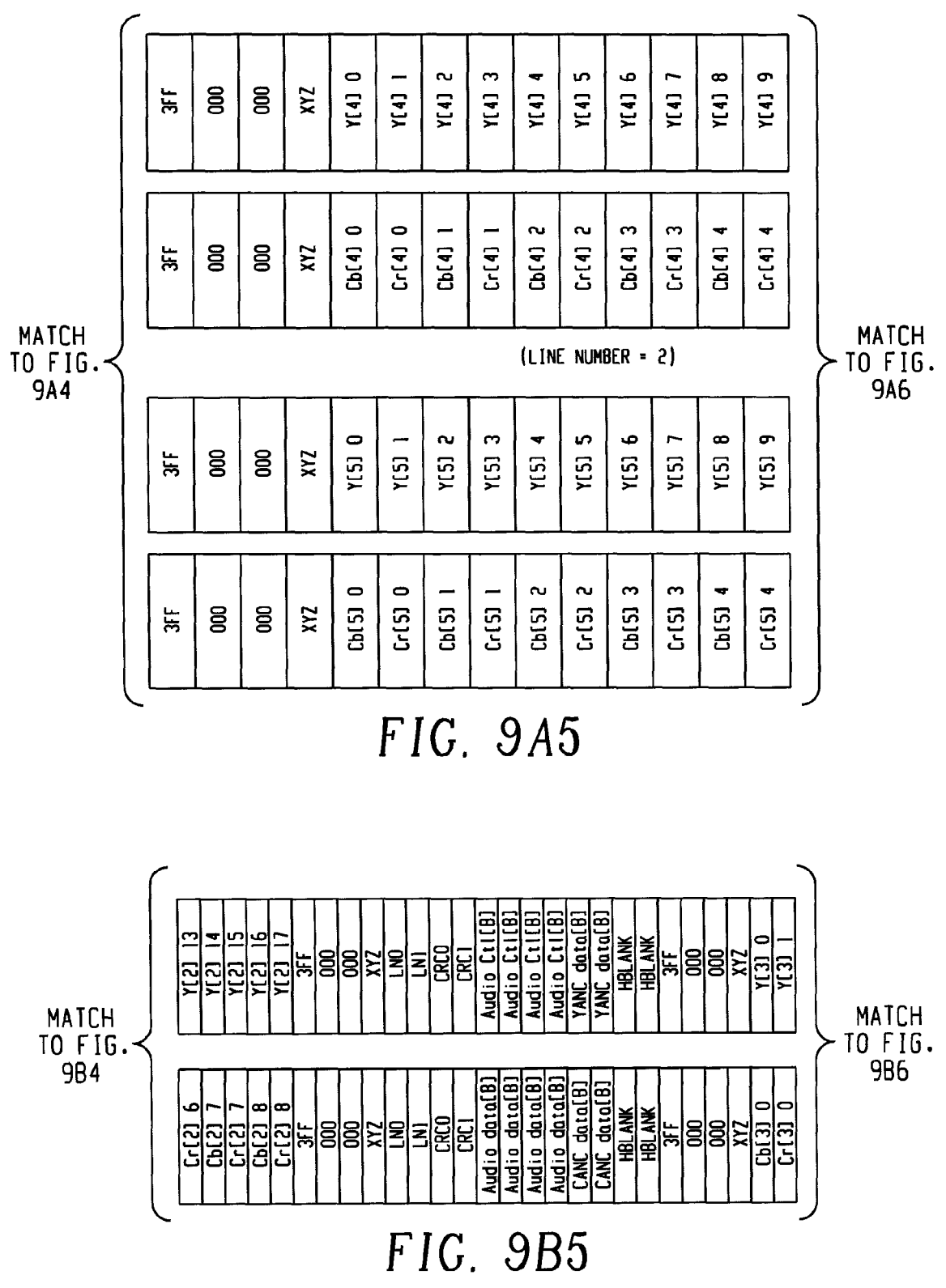

The timing reference signals (TRS), ancillary (ANC) flags, and Link A and Link B data are line multiplexed in a two-page FIFO 72 such that the data content from Link A and Link B are assembled in a continuous fashion, at twice the input parallel data rate. Any type of storage device or other hardware capable of being operated in this manner can be used for FIFO 72. The line multiplexing performed by FIFO 72 is illustrated in FIGS. 8, 9A, and 9B. FIG. 8 depicts the line interleaving concept while FIGS. 9A and 9B depict an example of line interleaving of Link A and Link B components.

Returning to FIG. 5A, line numbers are generated by a line number generator as shown at 74. The timing reference signals are used to trigger a line counter which embeds at 76 the correct line number produced by line number generator 74 according to SMPTE 425M, as reference to the input line count. Thereafter, Level A formatting formalities are addressed as represented by Block 78. In that manner, Level A data, as shown in FIG. 5D is produced by the receiver 50. In FIG. 5A, all components on the input side of FIFO 72 may be thought of as front-end circuitry while all components on the output or read side of FIFO 72 may be thought of as back-end circuitry.

Figure 6A:
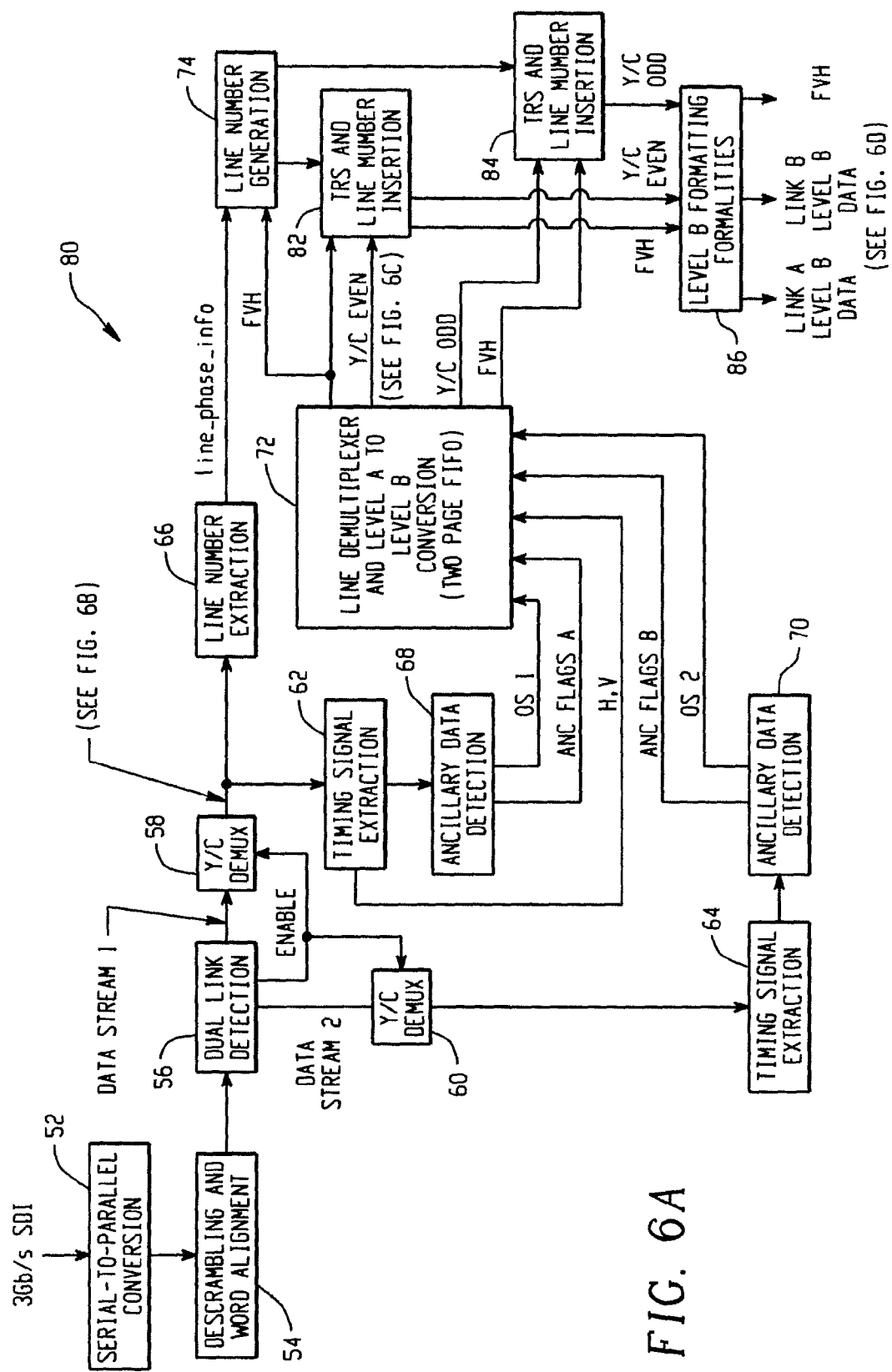
FIG. 6A is a block diagram illustrating a receiver incorporating Level A to Level B conversion of data according to the concepts of the present disclosure.

FIG. 6A is a block diagram illustrating a receiver 80 incorporating Level A to Level B conversion of data according to the concepts of the present disclosure. A number of components and signal paths are the same in the receiver 80 as in the receiver 50. Where appropriate, identical reference numbers have been used to indicate identical components and functionality. The following discussion summarizes the differences between receivers 80 and 50.

In FIG. 6A, the dual link detection 56 produces two data streams, indicated in the figure as data stream 1 and data stream 2. In the Level A to Level B conversion shown in FIG. 6A, the Y/C demultiplexers 58 and 60 are not operative. Data stream 1 is shown in FIG. 6B. The timing reference signals (TRS), ancillary (ANC) flags, and data streams 1 and 2 are line demultiplexed in FIFO 72 such that the data content from each data stream are split into even lines (Link A) and odd lines (Link B) shown in FIG. 6C. The same two-page FIFO 72 (or other hardware) can be utilized as before, but the configuration is different as the operation being performed is line demultiplexing as opposed to multiplexing. As before, the timing signal information is used to trigger TRS and line number insertion functions 82 and 84 which imbeds the correct line number according to SMPTE 372M. Each link's components are pixel-multiplexed to form a Level B compliant output as per SMPTE 372M. Level B formatting formalities may be attended to as shown by block 86.

FIG. 7A illustrates a Level B format, 372M line interleaved data stream while FIG. 7B illustrates how each link of the Level B data stream shown in FIG. 7A is pixel-demultiplexed; this is done primarily for ANC and error processing on each component, and has the added benefit of easy assembly of the individual Y and C components.

In the example of FIG. 5A, FIFO 72 write frequency for Link A and Link B in their respective parallel component form may be 75 MHz, and the read side frequency for the two multiplexed Level A components may be 150 MHz.

If N represents the number of pixels per line, the address write/read sequence (for one line) is as follows:

write sequence
data1: A1P[1] & B1P[N] address: 0, where P[N] corresponds to Pixel N
data2: A1P[2] & B1P[2] address: 1
data3: A1P[3] & B1P[3] address: 2
data4: A1P[4] & B1P[4] address: 3 . . .
. . .
dataN: A1P[N] & B1P[N] address: N (end of line)

read Sequence
line 1: A1P[1] thru A1P[N] addresses 0 thru N-1 [MSBs]
line 2: B1P[1] thru B1P[N] addresses 0 thru N-1 [LSBs]

The line depth requirement for 1080 p data is 2640 words for 1080 p/50 data, and 2200 words for 1080 p/60 data. An additional 800 words per link are used to support synchronous video switching. The switch point defined in RP168 may cause the active area to be lengthened by up to 10 µs; the extra 800 words will allow the FIFO to absorb an additional 10.7 µs of channel skew. Therefore the maximum line depth that the FIFO needs to handle is 2640+800=3440 words.

However, the FIFO 72 capacity needs to be double the line depth above, because each line needs to be completely buffered before it is transmitted. This is known as a page-mode FIFO. For example, the FIFO configuration is such that we will write lines 4 & 5 to "page 2" of the FIFO while simultaneously reading out lines 2 & 3 from "page 1."

Therefore, the overall FIFO depth will be 2×[2640+800] =6880 words. Each word will contain Y & C data (10 bits per component) for each link plus any control and timing data, such as ANC flags and timing reference signals. Therefore, the total bit width of each word in the FIFO is:

$Y$ data (Link $A$)+$C$ data (Link $A$)+$Y$ data (Link $B$)+$C$ data (Link $B$)+$YANC$ (Link $A$)+$CANC$ (Link $A$)+$YANC$ (Link $B$)+$CANC$ (Link $B$)+$H$+$V$=46 bits.

It should be understood that F need not be stored because it is set to 0 at the output for progressive video. Therefore, the total FIFO size will be 6880 words×46 bits=316,480 bits~39 kB. As a general rule, the FIFO should be sized to accommodate at least two lines of video data and preferably adequate space to accommodate a synchronous switch.

Figure 10:
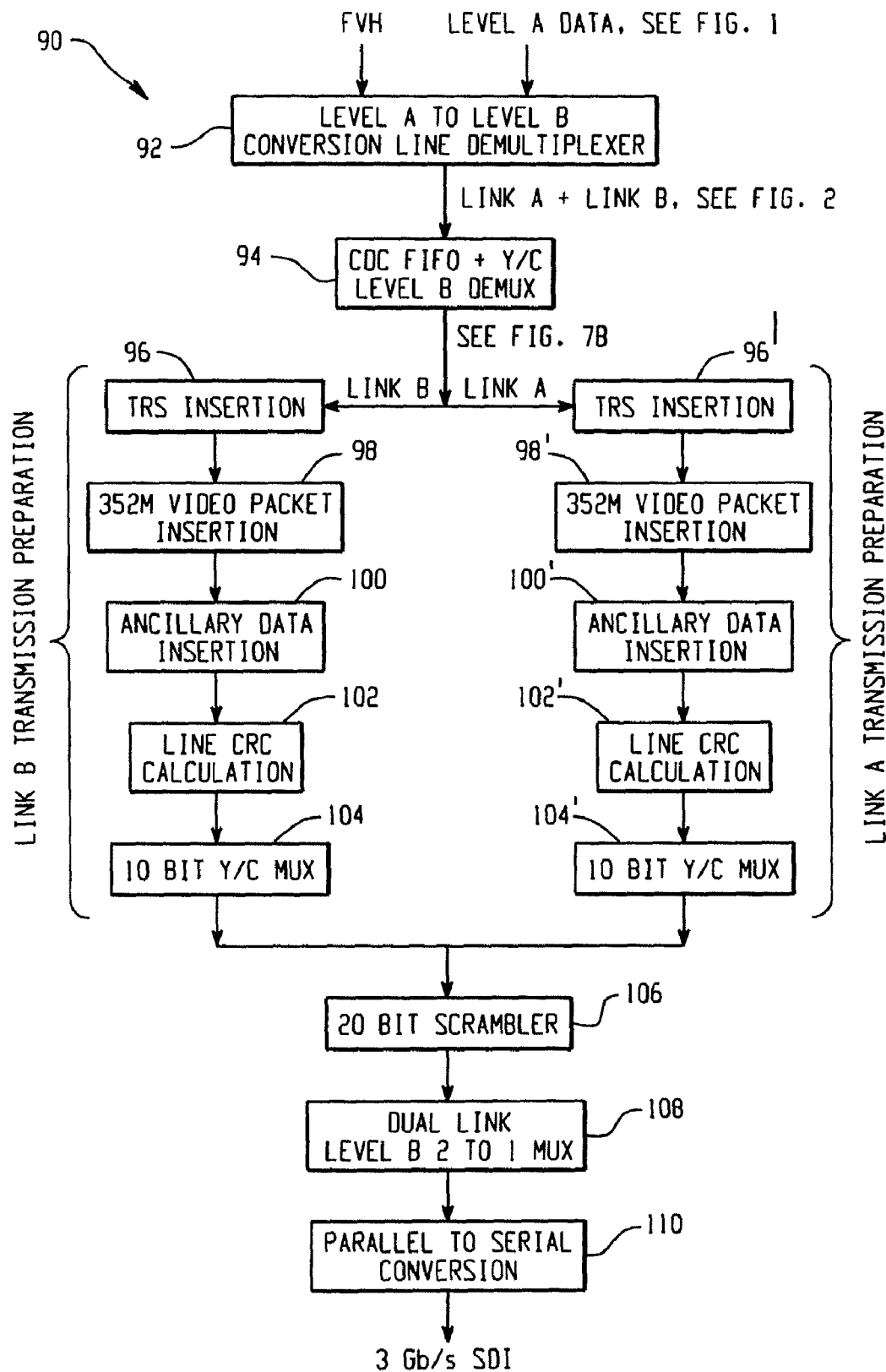
FIG. 10 is a block diagram illustrating a transmitter incorporating Level A to Level B conversion of data according to the concepts of the present disclosure.

FIG. 10 is an example of Level B to Level A conversion of data in a transmitter 90.

Before Level A to Level B conversion, it is assumed that the proper timing information is either extracted from the incoming data or provided externally so the data and timing information are provided at the input of the block 92, which may be a two-page FIFO or other hardware operated to perform line demultiplexing. The timing generation is a function of the transmitter as well.

Level A data shown in FIG. 1 is converted to Level B data shown in FIG. 2 by FIFO 92. After a Y/C demultiplexing function represented by block 94, each of the resulting A and B links is presented to the subsequent processing functions in a Level B demultiplexed format shown in FIG. 7B for processing at half the input data rate. After this point, each link contains identical line numbers, as they are embedded according to the SMPTE 292M digital interface, as specified in SMPTE 372M.

The TRS information is embedded individually on each of the resulting links as shown by blocks 96, 96' followed by video information embedded as indicated in the SMPTE 352M standard at blocks 98, 98'. Ancillary data can be inserted on either one of the links (but not both) as shown by blocks 100, 100'. The transmitter 90 recomputes the line CRCs for each link at blocks 102, 102'.

Figures 11A, 11B:
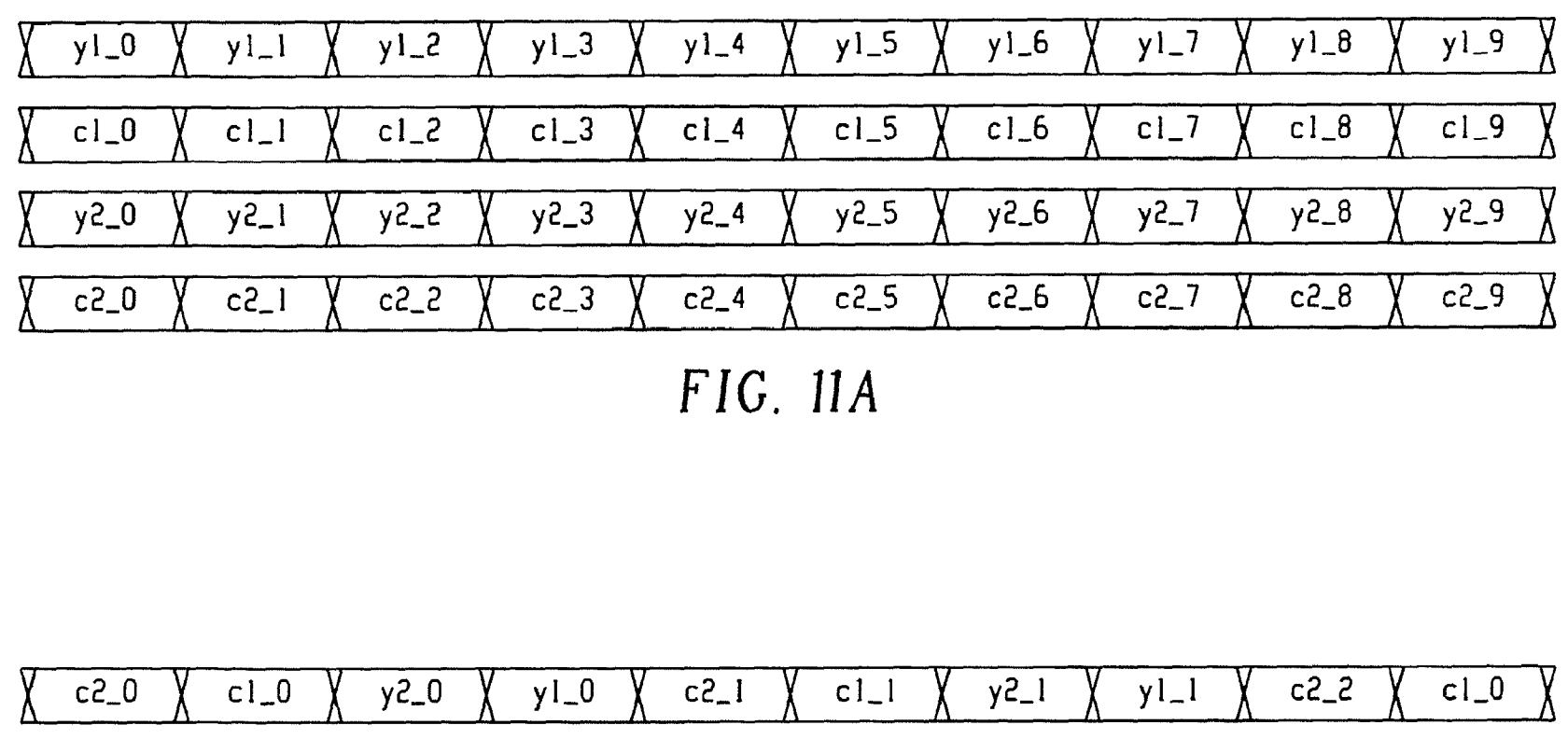

Following the CRC recalculation, the data for each link is Y/C multiplexed at blocks 104, 104' so both Level B links are in 10-bit multiplexed format. The two data streams are combined and scrambled at scrambler 106. The scrambled data stream is scrambled and then bit multiplexed at block 108 to result in a 10-bit data stream. The final output is formatted as shown in FIGS. 11A and 11B.

The resulting 10-bit data stream is converted to a serial data stream at block 110 conforming to SMPTE 424M and sent over the 3 Gbs SDI link.

Both the Y/C multiplexing and pixel multiplexing performed in the last parallel stage of the transmitter may be performed using minimum latency FIFOs so that the latency of the device is kept at a minimum. As with the receivers described above, all components on the input side of FIFO 92 may be thought of as front-end circuitry and all components on the output or read side of FIFO 92 may be thought of as back-end circuitry.

Figure 12:
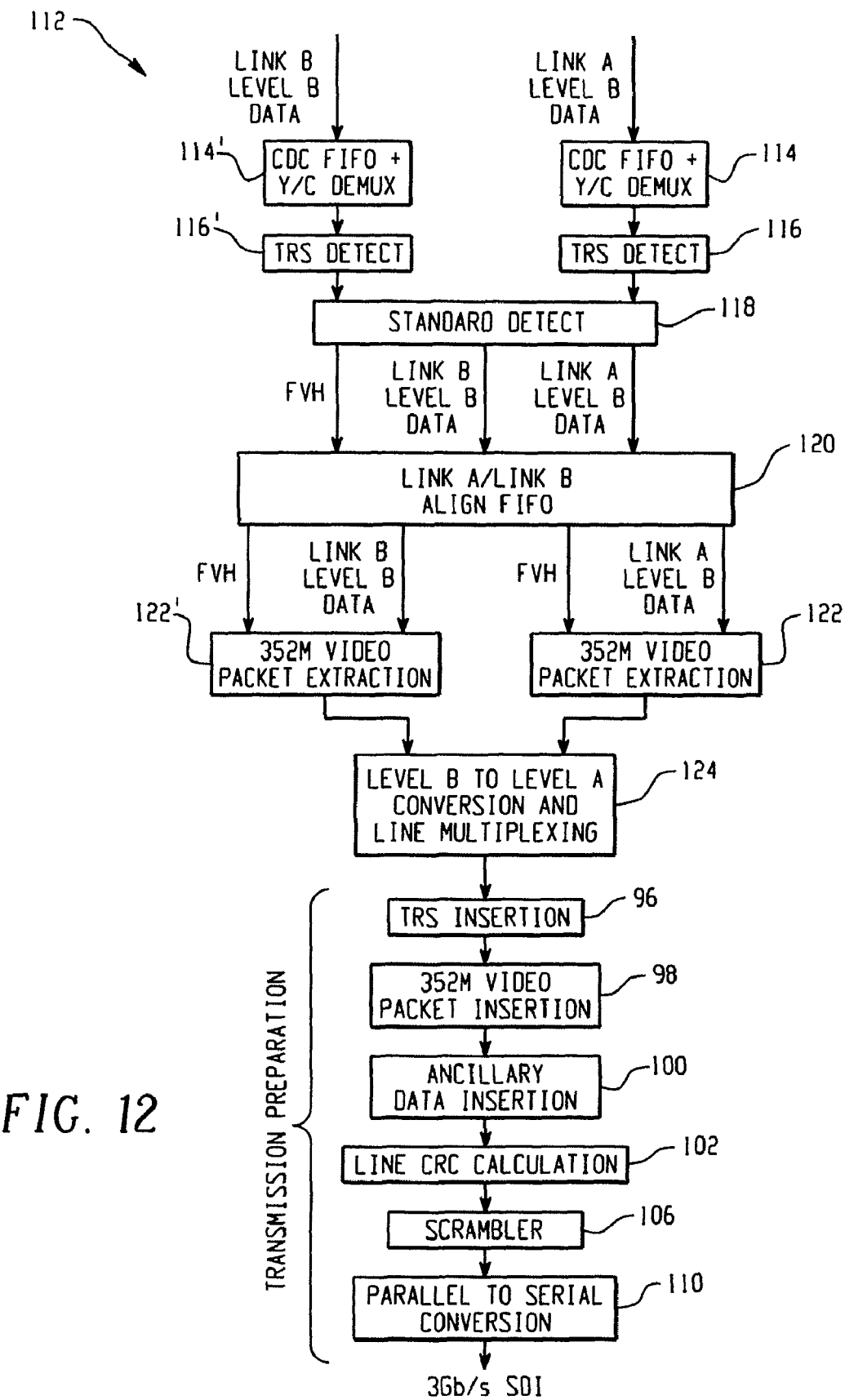
FIG. 12 is a block diagram illustrating a transmitter incorporating Level B to Level A conversion of data according to the concepts of the present disclosure.

FIG. 12 is a block diagram illustrating a transmitter 112 incorporating Level B to Level A conversion of data according to the concepts of the present disclosure. Where components in the transmitter 112 are providing the same function as the components of the transmitter 90, like reference numbers have been used. Because the transmitter 112 of FIG. 12 is capable of receiving Level B data, the front end of the transmitter 112 is somewhat different than the front end of the transmitter 90 shown in FIG. 10. In FIG. 12, Link A and Link B Level B data are received in a FIFO 114, 114', respectively, and a Y/C demultiplexing function is performed. Thereafter, a TRS detect is performed at 116, 116' followed by a standard detect performed at 118. A FIFO 120 receives the Link A and Link B Level B data along with FVH information so that alignment can be performed by. Packet extraction is performed on Link A and Link B by appropriate hardware as shown by blocks 122, 122', respectively. Thereafter, Level B to Level A conversion and line multiplexing is performed by, for example, a two-page FIFO 124. The two-page FIFO 124 may be similar in construction to the FIFO 92 found in the transmitter 90 of FIG. 10, but is operated differently. The output of the FIFO 124 is then processed through a transmission preparation process, previously described in conjunction with FIG. 10.

Level B equipment is complex to implement, as it requires line multiplexing/demultiplexing and further formatting of 1080 p data to interface with equipment such as image processors. The line mux/demux functions require large line buffers to be implemented in external FPGAs, which is costly from an FPGA resource point of view, and may cause undue burden during routing and timing closure as memory and logic utilization within the FPGA increases.

Going forward, customers will need to modify their 3 Gb/sec infrastructure to accommodate the more elegant Level A mapping mode to reduce the cost of transmitting and routing higher-bandwidth HDTV formats. However, a considerable amount of dual-link equipment is already in the field, and upgraded systems will still need to interface with legacy equipment.

One of the receivers described herein, in performing the Level B to Level A mapping function in the receiver, has at least two benefits:

(1) it eliminates the need for a secondary device (such as an FPGA) to perform this conversion, reducing system cost; and (2) it frees up considerable resources in an FPGA that already exists in a system by avoiding the requirement for using large amounts of memory for multiplexing/demultiplexing.

These benefits allow the customer to perform other high-priority functions in the FPGA while reducing routing density, improving timing closure, and thereby reducing overall system development time.

One of the transmitters described herein, in performing the Level A to Level B mapping function in the transmitter, has at least two benefits:

(1) it eliminates the need for a secondary device (such as an FPGA) to perform this conversion, reducing system cost; and (2) it frees up considerable resources in an FPGA that already exists in a system by avoiding the requirement for using large amounts of memory for multiplexing/demultiplexing.

These benefits allow the customer to perform other high-priority functions in the FPGA while reducing routing density, improving timing closure, and thereby reducing overall system development time.

Although the present disclosure describes a method and apparatus in terms of one or more embodiments, many modifications and variations are possible. For example, one or more steps of methods described above may be performed in a different order and still achieve desirable results. The following claims are intended to encompass all such modifications and variations.

It is claimed:

1. A receiver for converting data received in either a Level A or Level B SMPTE 425M compliant format into either a Level B or a Level A compliant format, respectively, said receiver comprising:
   front-end circuitry for receiving and processing data in one of a Level A or a Level B SMPTE 425M compliant format;
   a storage device for receiving Level A formatted data and for reading out Level B formatted data or for receiving Level B formatted data and for reading out Level A formatted data; and
   back-end circuitry for further processing and outputting Level A formatted data when Level B formatted data is received or Level B formatted data when Level A formatted data is received.

2. The receiver of claim 1 wherein said storage device is a FIFO register having a capacity of at least two lines of video data.

3. The receiver of claim 1 wherein said storage device is operated as a line multiplexer to convert data in a Level B format to data in a Level A format.

4. The receiver of claim 1 wherein said storage device is operated as a line demultiplexer to convert data in a Level A format to data in a Level B format.

5. A transmitter for converting data received in either a Level A or Level B SMPTE 425M compliant format into either a Level B or a Level A compliant format, respectively, said transmitter comprising:
   front-end circuitry for receiving and processing data in one of a Level A or a Level B SMPTE 425M compliant format;
   a storage device for receiving Level A formatted data and for reading out Level B formatted data or for receiving Level B formatted data and for reading out Level A formatted data; and
   back-end circuitry for preparing Level A formatted data for transmission when Level B formatted data is received or for preparing Level B formatted data for transmission when Level A formatted data is received.

6. The transmitter of claim 5 wherein said storage device is a FIFO register having a capacity of at least two lines of video data.

7. The transmitter of claim 5 wherein said storage device is operated as a line multiplexer to convert data in a Level B format to data in a Level A format.

8. The transmitter of claim 5 wherein said storage device is operated as a line demultiplexer to convert data in a Level A format to data in a Level B format.

9. A method performed in a single device for converting data received in either a Level A or Level B SMPTE 425M compliant format into either a Level B or a Level A compliant format, respectively, said method comprising:

receiving and processing data in one of a Level A or a Level B SMPTE 425M compliant format;

inputting Level A formatted data into a storage device and reading out Level B formatted data at an output of the storage device, or inputting Level B formatted data into the storage device and reading out Level A formatted data at an output of said storage device; and further processing of Level A formatted data when Level B formatted data is received or Level B formatted data when Level A formatted data is received.

10. The method of claim 9 wherein said method is preformed in a video transmitter.

11. The method of claim 10 wherein said inputting and reading out is performed in a FIFO register having a capacity of at least two lines of video data.

12. The method of claim 10 wherein said storage device is operated as a line multiplexer to convert data in a Level B format to data in a Level A format.

13. The method of claim 10 wherein said storage device is operated as a line demultiplexer to convert data in a Level A format to data in a Level B format.

14. The method of claim 9 wherein said method is preformed in a video receiver.

15. The method of claim 14 wherein said inputting and reading out is performed in a FIFO register having a capacity of at least two lines of video data.

16. The method of claim 14 wherein said storage device is operated as a line multiplexer to convert data in a Level B format to data in a Level A format.

17. The method of claim 14 wherein said storage device is operated as a line demultiplexer to convert data in a Level A format to data in a Level B format.

* * * * *